United States Patent [19]

Nicolich

[11] Patent Number: 4,797,014

[45] Date of Patent: Jan. 10, 1989

[54] HIGH-SPEED ANTI-FRICTION BEARING PARTICULARLY FOR AIRPLANE POWER PLANTS

[75] Inventor: Patrick Nicolich, Dittlebrunn, Fed. Rep. of Germany

[73] Assignee: FAG Kugelfischer Georg Schafer (KGaA), Fed. Rep. of Germany

[21] Appl. No.: 145,519

[22] Filed: Jan. 19, 1988

[30] Foreign Application Priority Data

Aug. 27, 1987 [DE] Fed. Rep. of Germany ... 8711624[U]

[51] Int. Cl.$^4$ .................. F16C 19/06; F16C 33/66; F16C 33/60; F16C 33/46

[52] U.S. Cl. ............................ 384/490; 384/475; 384/506; 384/523; 384/569

[58] Field of Search ............... 384/462, 475, 490, 499, 384/505, 506, 513, 515, 523, 564, 569, 570, 627

[56] References Cited

U.S. PATENT DOCUMENTS

| | | | |
|---|---|---|---|
| 3,269,786 | 8/1966 | Diver et al. | 384/475 |
| 4,334,720 | 6/1982 | Signer | 384/475 |
| 4,463,994 | 8/1984 | Eliason et al. | 384/506 |

Primary Examiner—Stuart S. Levy
Assistant Examiner—Thomas R. Hannon
Attorney, Agent, or Firm—Ostrolenk, Faber, Gerb & Soffen

[57] ABSTRACT

A high-spped anti-friction bearing particularly useful for airplane power plants, the bearing having an outer ring and an inner ring. The inner ring is axially split at the rolling elements into two axial sections. The axial sections are each generally L-shaped in cross section, with one arm of each L backed against the other. To enable the bearing rings to be relatively thin walled in the radial direction and to prevent undesirable deformation thereof during the manufacture or installation, each of the rings is provided on at least one axial side and preferably on both axial sides with projecting axial extensions. Each extension preferably tapers narrower in its radial thickness axially outward. Each extension includes a cylindrical portion and a frustoconically shaped portion, usually with the cylindrical portion axially more inward and the frustoconical portion axially more outward. The cage for the rolling elements also has axial extensions at one or both sides and comprised of a cylindrical portion followed axially outward by a frustoconical portion.

20 Claims, 1 Drawing Sheet

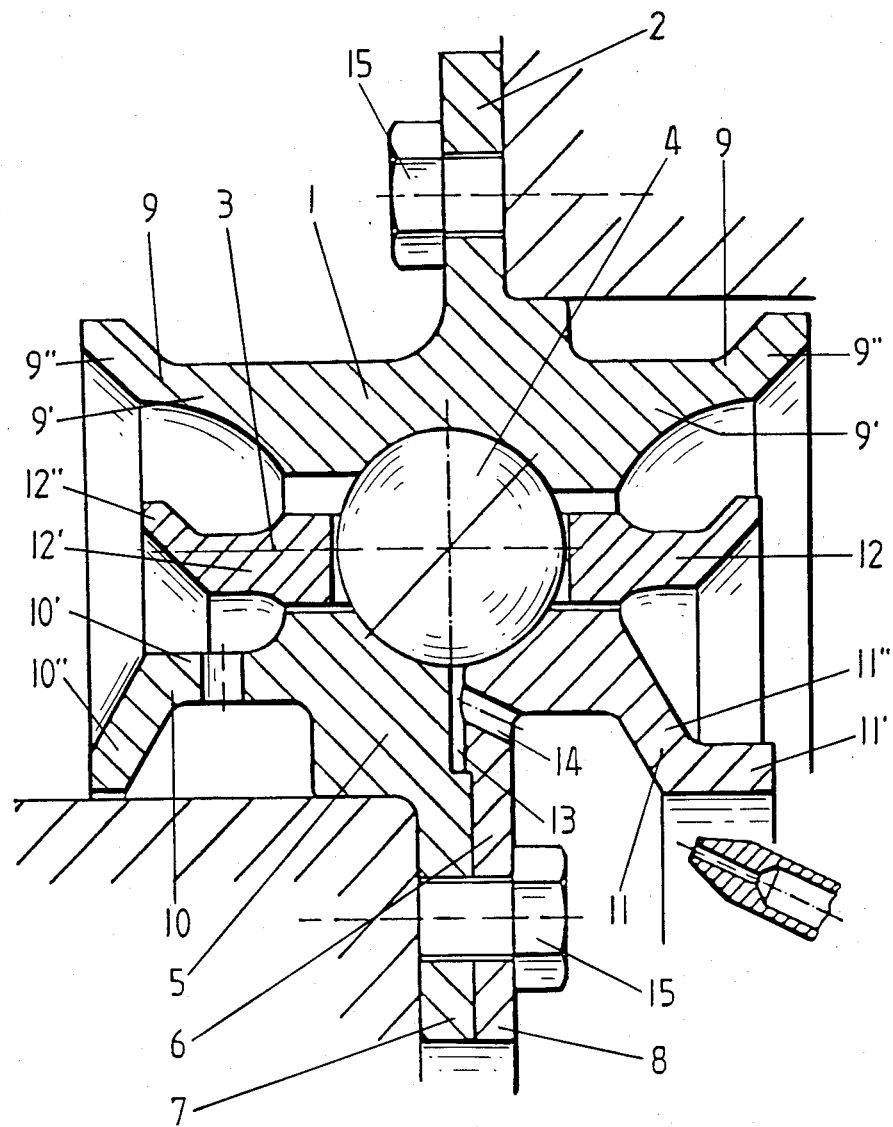

HIGH-SPEED ANTI-FRICTION BEARING PARTICULARLY FOR AIRPLANE POWER PLANTS

BACKGROUND OF THE INVENTION

The present invention refers to a high-speed anti-friction bearing, particularly useful for airplane engines.

Anti-friction bearings for airplanes must, like all other airplane parts, be as light as possible. To accomplish that, they should be of small cross sections. Furthermore, they must be suitable for rotation speeds which are as high as possible. These properties have heretofore been obtained in bearings through making the pitch circles of the bearings relatively small, for instance, at most about 250 mm. In this way, speeds of rotation of about 8000 rpm were obtainable. These very high speeds of rotation are possible primarily because the individual parts of the bearing are manufactured with very high precision. Furthermore, the bearing rings have a relatively thick cross section referred to their pitch circle. As a result, upon both manufacture and installation of the bearing, twisting or undulation of the raceways does not occur. Those would otherwise reduce the maximum speed of rotation. Such bearings are known from Federal Republic of Germany DE OS No. 14 25 094 and British Published Application No. 21 09 481.

For their attachment and lubrication, the bearings have flanges which are integrated with the rings. A stiffening effect was provided by these flanges for the rings. But it was unimportant, in view of the large cross sections of the rings.

In modern airplane power plants, the bearings are to be substantially increased in diameter but are to be kept as small as possible in cross section in order to save weight. Such so-called thin-ring bearings are very difficult to manufacture with the required precision. Upon machining of the rings, (for instance, turning the rings on a lathe, hardening and grinding them) stresses are induced. Despite the attachment of the rings in the bearing housing, the stresses lead to inaccuracies, particularly because the housings themselves do not have any great stiffness, in order to save weight.

It is obvious to increase the rotation speeds of such bearings by forming the parts with higher precision. More precise manufacture of the rings to an economically feasible extent produces an increase in the speed of rotation. But this increase is at most only twice the speed obtainable with ordinary thin-ring bearings of the same size. For the speeds of rotation desired in modern airplane power plants, the speeds heretofore achievable, however, are still more than half too slow. This is confirmed in the journal "Aviation Week & Space Technology" of Apr. 13, 1987, page 74, which states that there is still no suitable large bearing.

SUMMARY OF THE INVENTION

The object of the present invention is to improve the bearing parts so that despite their thin-walled cross sections, very high dimensional stability is obtained upon their manufacture as well as in their installed condition, so that substantially higher speeds of rotation can be accepted.

In a high speed anti-friction bearing comprised of an outer ring, an inner ring and a complement of rolling elements, like balls, between the races of the rings, this object is achieved with axial extensions projecting from at least one axial side and preferably from both axial sides of both the inner and outer rings, for strengthening the rings. The extensions at both axial sides are axially outward of the rolling elements. Each axial extension comprises a generally cylindrically shaped portion extending generally parallel to the axis of the bearing and an axially neighboring, preferably integrated, frustoconical or bent extension, bent off at an angle, preferably about 45°. The extension is arranged so that typically the cylindrical portion of the extension is first and the frustoconical portion is axially next outward, although that axial relationship may be reversed. The radial thickness dimension of the extension may gradually taper thinner toward the free end of the extension for weight reduction, without substantial reduction in the stiffening function.

There is a cage or rolling element separator between the rings. In order for the cage to have the same benefits as the rings, there is the same type of axial extension at one or both axial sides of the cage axially outward of the rolling elements at the cage.

One of the rings, and preferably the inner ring, is axially split in the axial vicinity of the rolling elements to define two axial sections of the ring, each being generally L-shaped in partial cross-section. One leg of the L extends axially outward toward the respective extension and the other leg of the L projects radially outward. The two radially projecting legs are adjacent. A circumferential slot is defined between those legs for lubrication, and a lubrication hole extends into that slot through one of the radial legs. The axial extensions of the bearing rings substantially increases their dimensional stability. Both upon manufacture and, even more important, after installation of the rings, undulations or bends of the rings are substantially reduced. This is primarily the result of the cylindrical portions of the axial extensions, which act positively, essentially in the axial direction. The end sections of the axial extensions, which are bent off at about 45°, additionally increase the radial stiffness of the rings.

Despite their low weight, the rings are so stable that even inaccuracies in the generally thin housing are compensated. Speeds of rotation can then be achieved with these bearing which amount, for instance, to about 2000 rpm, with a pitch circle diameter of about 750 mm. This represents a substantial improvement over the prior art in which thin ring bearings of similar size have a maximum speed of rotation of about 300 rpm, although that maximum value can be doubled by more accurate machining.

For saving weight, in accordance with a further development of the invention, the axial extensions of the rings taper in radial thickness toward their free ends. In this way, the stiffness of the rings is scarcely reduced, but the volume of material of the rings is further decreased.

From a manufacturing standpoint, it is favorable if the axial extensions extend freely into space and do not rest against other surfaces. A special, precise machining of these sections is then not necessary, without the other functional capabilities of the axial extensions being thereby reduced. Furthermore, this does not result in any negative effect on the precision of the raceway of the bearing which could be caused by possibly inaccurate housing parts.

For reasons of mounting, it may be favorable, in accordance with another development to axially divide at least one of the bearing rings, producing two or double-L shaped rings, as seen in partial cross section. In such case, due to the high shoulders or lips for that ring, ball bearings which can take on high loads are possible. It is merely necessary to introduce the balls into the bearing ring races before the attachment of the last split bearing ring. In this embodiment, a circumferential slot can be simply provided between the two L-shaped ring parts, the slot being accessible from the outside through at least one hole. This substantially increases the feeding of lubricating oil to the balls. The reduction of bearing temperature which is thereby made possible also contributes to the increase in permissible speed of rotation.

The balls are preferably formed of a ceramic material, for instance, silicon nitride. This reduces the weight of the balls and thus reduces the load resulting from centrifugal force, which also increases the maximum speed of rotation.

Although rolling elements in the form of balls are disclosed, other appropriately shaped rolling elements may be used, and the races in the rings would be correspondingly shaped.

BRIEF DESCRIPTION OF THE DRAWING

Other objects and features of the invention are described with reference to the accompanying drawing, FIG. 1, which is a partial cross section through a bearing for airplane power plants.

DESCRIPTION OF A PREFERRED EMBODIMENT

The ball bearing shown in FIG. 1 is comprised of the outer ring 1 having the customary radially outwardly projecting, annular, fastening flange 2, the annular cage 3 for spacing the balls 4, and the two axial section inner ring 5, 6. Each inner ring section has a respective fastening flange 7, 8. The rings 1 and 5, 6 are in this connection relatively large, referred to the diameter of the bearing. Therefore the rings have thin walls in their radial dimension. The rings each have races formed in them through which the balls 4 move.

In order to increase the stability of the rings, respective axial extensions 9, 10, 11 are arranged on the axial ends of the rings 1 and 5, 6. The axial extensions 9 and 10 generally comprise cylindrical intermediate sections 9' and 10' located axially beyond the balls 4, followed axially outward by and integral with end sections 9" and 10" which are bent from the axial direction of the bearing, at about 45°, so that the end sections are frustoconically shaped. The extension 11 is slightly different from the extensions 9 and 10 in that the extension 11 has a bent off frustoconical intermediate section 11" and a cylindrical end section 11'. The extensions 9, 10 and 11 make the respective bearing rings extremely stable not only upon their manufacture, but also after their installation. In this connection, even possibly inaccurate housing parts 12 and 13 are corrected when the fastening screws 15 in the flanges 2 and 7, 8 are tightened.

For a saving in weight, the axial extensions 9, 10, 11 taper down in radial thickness toward their free ends. For this reason, the intermediate cylindrical section 9', for instance, has a thicker cross section than the end section 9", with a continuous transition having been selected here. Generally corresponding radial tapering is provided for the extension 11 and somewhat for the extension 10. Because the axial extensions 9, 10, 11 do not rest against the bearing housing, highly precise manufacture of these parts is not necessary.

Since similar problems exist in the case of the cage or separator 3 as are found in the case of the rings, the cage also is provided on both axial sides with axial extensions 12 which comprise an intermediate cylindrical portion 12' and an obliquely inclined, frustoconical outer portion 12".

The inner ring is comprised of two approximately L-shaped ring sections or parts 5 and 6, having the respective extensions 10 and 11. One arm of each ring part 5, 6 extends axially outward. The other arm of each ring part projects radially inward and is pressed against the opposed axial surface of the corresponding arm of the other ring part. In the region of and radially outward from the inner ring raceway, between the adjacent arms of the ring parts 5, 6, a circumferential slot 13 is defined in one or both of the arms, which has at least one oblique access hole 14 leading to it and passing through the arm of one ring part. In this way, lubricating oil which is collected in increased amount by the extension 11, can be easily introduced into the interior of the bearing. This improves the circulation of the lubricant and the cooling of the bearing, thus contributing to a higher maximum speed of rotation.

Instead of a ball bearing, the invention can, of course, also be used for a roller bearing, which otherwise has the same features disclosed herein. The same advantages are then also obtained.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A high-speed anti-friction bearing comprising an outer ring, an inner ring inward of and spaced from the outer ring, and the rings defining races for rolling elements moving between the rings; rolling elements supported in the races of the rings;

at at least one axial side of the bearing, axially outward of the rolling elements at that one axial side, the inner ring and the outer ring are both provided with respective axial extensions projecting axially outward for strengthening the rings against deformation; each axial extension comprises a generally cylindrically shaped portion and connected thereto an annular portion which is inclined at an angle from the cylindrical portion for generally defining a frustoconical portion.

2. The bearing of claim 1, wherein at both axial sides of the bearing on both the inner and the outer rings, axially outward of the rolling elements, respective ones of the axial extensions are defined.

3. The bearing of claim 2, wherein at least one of the rings is axially split, generally at the axial location of the rolling elements, whereby that ring is in two axial sections.

4. The bearing of claim 3, wherein each of the axial sections of the split ring is, in cross-section, generally of L-shape, with a first arm of each L-shape section extending axially outwardly and having a free-end defining the axial extensions, and with a second arm of the section extending radially, and the second arms of both of the axial sections being adjacent.

5. The bearing of claim 4, wherein the inner ring is the ring that is axially split.

6. The bearing of claim 4, wherein the second arms of the axial sections are shaped to together define a circumferential slot between the second arms, and the circumferential slot communicates to the races for the rolling elements.

7. The bearing of claim 6, further comprising a lubricating oil feed hole communicating through one of the axial sections to the slot.

8. The bearing of claim 3, wherein the axial sections are shaped to together define a circumferential slot between the axial sections and the circumferential slot communicates to the races for the rolling elements.

9. The bearing of claim 2, wherein at least some of the axial extensions taper narrower in radial thickness axially outward toward the free ends of the extensions.

10. The bearing of claim 2, wherein the rolling elements are comprised of a ceramic material.

11. The bearing of claim 10, wherein the rolling elements are comprised of silicon nitride.

12. The bearing of claim 11, wherein the rolling elements are balls.

13. The bearing of claim 2, wherein the rolling elements are balls.

14. The bearing of claim 1, wherein the inclined frustoconical portion of the axial extensions inclined at an angle of about 45° from the axis of the bearing.

15. The bearing of claim 1, wherein at least some of the axial extensions taper narrower in radial thickness axially outward toward the free ends of the extensions.

16. The bearing of claim 1, further comprising a housing around the bearing, at least some of the axial extensions from the rings extending freely into space for avoiding resting against the bearing housing.

17. The bearing of claim 1, further comprising a cage between the rings, the cage including means spacing and separating the rolling elements.

18. The bearing of claim 17, wherein at at least one axial side of the cage, a cage axial extension projects from the cage and extends axially beyond the rolling elements, the cage axial extension comprises a generally cylindrically shaped portion and an annular, inclined, frustoconical portion axially next to the cylindrical portion.

19. The bearing of claim 18, wherein there is a respective cage axial extension projecting from both axial sides of the cage.

20. The bearing of claim 19, wherein at at least most of the axial extensions of the rings and the cage, the cylindrical portion is followed axially outward by the frustoconical, portion.

* * * * *